(12) United States Patent
Mori et al.

(10) Patent No.: US 8,820,193 B2
(45) Date of Patent: Sep. 2, 2014

(54) DRIVING FORCE DISTRIBUTION DEVICE

(75) Inventors: Atsuhiro Mori, Fujisawa (JP); Takeshi Yamamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 860 days.

(21) Appl. No.: 12/810,255

(22) PCT Filed: Dec. 19, 2008

(86) PCT No.: PCT/JP2008/073231
§ 371 (c)(1),
(2), (4) Date: Jun. 23, 2010

(87) PCT Pub. No.: WO2009/081876
PCT Pub. Date: Jul. 2, 2009

(65) Prior Publication Data
US 2010/0276246 A1 Nov. 4, 2010

(30) Foreign Application Priority Data

Dec. 26, 2007 (JP) ................................. 2007-333739
Nov. 5, 2008 (JP) ................................. 2008-284150

(51) Int. Cl.
*F16H 37/06* (2006.01)
*F16H 1/32* (2006.01)

(52) U.S. Cl.
USPC ....................................... 74/665 F; 475/165

(58) Field of Classification Search
CPC .. B60K 17/344; B60K 17/08; B60K 23/0808; B60N 2/0232; F16H 1/32; F16H 1/222; F16H 13/06; F16H 3/08; F16H 3/089; F16H 1/00; F16H 3/70; F16H 13/14
USPC ......... 74/665 F, 665 G, 665 K; 475/165, 166, 475/249; 180/233, 240
See application file for complete search history.

(56) References Cited

U.S. PATENT DOCUMENTS 3,378,093 A * 4/1968 Hill ............................... 180/249
3,475,993 A * 11/1969 Hewko ........................... 475/195
(Continued)

FOREIGN PATENT DOCUMENTS

EP 1 808 617 A1 7/2007
JP 2-33956 U 3/1990
(Continued)

OTHER PUBLICATIONS

U.S. Appl. No. 12/864,194, filed Jul. 22, 2010, Mori.
(Continued)

*Primary Examiner* — Troy Chambers
*Assistant Examiner* — Jude Agendia
(74) *Attorney, Agent, or Firm* — Foley & Lardner LLP

(57) ABSTRACT

A driving force distribution device includes a first friction roller that rotates together with a rotating member constituting a torque-transmitting path to the main driving wheel; a second friction roller that rotates together with a rotating member constituting a torque-transmitting path to the auxiliary driving wheel; and an inter-roller radial press section that presses the first and second friction rollers in radial directions of the first and second friction rollers into pressing contact with one another, to allow torque transmission between the first and second friction rollers, wherein the inter-roller radial press section sets a radial pressing force between the first and second friction rollers to limit torque input to the auxiliary driving wheel by allowing slippage between the first and second friction rollers when a maximum torque is inputted to the driving force distribution device under a condition that torque distribution to the auxiliary driving wheel is maximized.

11 Claims, 10 Drawing Sheets

(56) References Cited

U.S. PATENT DOCUMENTS

| | | | |
|---|---|---|---|
| 4,014,224 A | | 3/1977 | Pitts |
| 4,483,055 A | | 11/1984 | Sekimoto et al. |
| 4,559,846 A | * | 12/1985 | Cochran et al. .......... 74/665 GA |
| 4,656,891 A | | 4/1987 | Durand |
| 4,782,721 A | * | 11/1988 | Dick ..................... 74/665 GA |
| 4,901,598 A | * | 2/1990 | Batchelor et al. ........ 74/665 GA |
| 4,907,472 A | | 3/1990 | Mura |
| 5,054,335 A | * | 10/1991 | Andrews .................. 74/665 GA |
| 5,518,464 A | * | 5/1996 | Teraoka ....................... 475/252 |
| 6,199,653 B1 | | 3/2001 | Matsufuji et al. |
| 6,238,317 B1 | * | 5/2001 | Brown et al. ................. 475/206 |
| 6,438,480 B2 | | 8/2002 | Tanaka et al. |
| 6,440,030 B1 | | 8/2002 | Minegishi et al. |
| 6,551,211 B2 | | 4/2003 | Kanazawa |
| 6,719,658 B2 | | 4/2004 | Haga et al. |
| 6,849,025 B2 | | 2/2005 | Chikaraishi et al. |
| 6,955,623 B2 | | 10/2005 | Pattok |
| 7,387,588 B2 | | 6/2008 | Bader |
| 7,575,535 B2 | | 8/2009 | Yamamoto |
| 7,628,722 B2 | | 12/2009 | Yoshimura |
| 8,187,134 B2 | * | 5/2012 | Mori et al. ..................... 475/165 |
| 8,316,738 B2 | * | 11/2012 | Hellinger et al. ............ 74/665 H |
| 8,483,921 B2 | * | 7/2013 | Sakagami et al. ............. 701/69 |
| 8,579,757 B2 | * | 11/2013 | Sakagami et al. ............. 476/67 |
| 2002/0124686 A1 | * | 9/2002 | Ohtani et al. ................ 74/665 F |
| 2002/0147068 A1 | | 10/2002 | Chikaraishi et al. |
| 2004/0198549 A1 | | 10/2004 | Wafzig |
| 2005/0143211 A1 | * | 6/2005 | Yamamoto ..................... 475/183 |
| 2005/0266954 A1 | * | 12/2005 | Yoshimura .................... 475/249 |
| 2008/0064553 A1 | | 3/2008 | Newton |

FOREIGN PATENT DOCUMENTS

| | | |
|---|---|---|
| JP | 2001-341539 A | 12/2001 |
| JP | 2002-87091 A | 3/2002 |
| JP | 2002-87092 A | 3/2002 |
| JP | 2002-349653 A | 12/2002 |
| JP | 2003-028251 A | 1/2003 |
| JP | 2003-247617 A | 9/2003 |
| JP | 2004-306948 A | 11/2004 |
| JP | 2005-188701 A | 7/2005 |
| JP | 2005-337442 A | 12/2005 |
| JP | 2006-132738 A | 5/2006 |

OTHER PUBLICATIONS

U.S. Appl. No. 12/864,188, filed Jul. 22, 2010, Mori.
USPTO Notice of Allowance, U.S. Appl. No. 12/864,188, Nov. 26, 2012, 12 pages.
A. Mori et al., US PTO Notice of Allowance, U.S. Appl. No. 12/864,194, dated Feb. 2, 2012, (13 pgs.).

* cited by examiner

DRIVING FORCE DISTRIBUTION DEVICE

TECHNICAL FIELD

The present invention relates to improvement in a driving force distribution device useful as a transfer of a four wheel drive vehicle.

BACKGROUND OF THE INVENTION

Conventionally, a patent document 1 discloses a common driving force distribution device. The driving force distribution device disclosed in this document is a transfer of a four wheel drive vehicle, which includes a planetary gearset, and sets driving force distribution (torque distribution) between main and auxiliary driving wheels, wherein a torque from a transmission is inputted into a carrier of the planetary gearset, and the torque is split and outputted from the carrier through a sun gear and a ring gear to the main driving wheels and the auxiliary driving wheels.
Patent Document 1: JP 2005-337442 A

SUMMARY OF THE INVENTION

In such a conventional driving force distribution device as mentioned above, the distribution ratio between torque to the main driving wheels (main driving wheel torque), and torque to the auxiliary driving wheels (auxiliary driving wheel torque) is uniquely determined by tooth specifications (the number of teeth of the sun gear, and the number of teeth of the ring gear, for the construction of patent document 1), because the torque distribution between the main and auxiliary driving wheels is implemented with a gearset such as a planetary gearset.

Accordingly, the distribution ratio between the main driving wheel torque and the auxiliary driving wheel torque is constant in the entire torque range, so that as the input torque to the driving force distribution device increases, the main driving wheel torque increases naturally, and the auxiliary driving wheel torque increases accordingly in the entire torque range, depending on the distribution ratio. Accordingly, when a maximum torque (torque when the engine torque is maximum, and the transmission gear ratio is one corresponding to the lowest gear) Tinmax is inputted to the driving force distribution device under an auxiliary driving wheel torque maximum distribution condition that the auxiliary driving wheel torque distribution ratio is equal to a maximum value kmax, a large torque (auxiliary driving wheel maximum distribution torque Tfkmax=kmax×Tinmax) based on the torque distribution ratio kmax under the auxiliary driving wheel torque maximum distribution condition and the maximum input torque Tinmax is directed to the auxiliary driving wheels.

Although it is however unnecessary to direct such a large to the auxiliary driving wheels under actual use environments, an unnecessarily large torque is directed to the auxiliary driving wheels. Since it is possible that such an unnecessarily large torque is directed to the auxiliary driving wheels, the driving system of the auxiliary driving wheels must be designed to resist such a large torque. If the conventional driving force distribution device is employed, the strength of the driving system must be enhanced higher than necessary for actual use. This causes problems of unnecessary costs, and weight increase.

In consideration of the fact described above, the present invention proposes a driving force distribution device which is capable of restricting a maximum distribution condition maximum roller-transmitted torque under an auxiliary driving wheel torque maximum distribution condition, which is determined by a radial pressing force between rollers, and has an object to solve the problem about cost and weight increase by making it unnecessary to enhance the strength of the driving system of the auxiliary driving wheels higher than necessary for actual use.

For this object, the driving force distribution device according to the present invention is based on a driving force distribution device configured to set torque distribution between main and auxiliary driving wheels by splitting and outputting to the auxiliary driving wheel a part of torque to the main driving wheel, and includes: a first roller that rotates together with a rotating member constituting a torque-transmitting path to the main driving wheel; a second roller that rotates together with a rotating member constituting a torque-transmitting path to the auxiliary driving wheel; and an inter-roller radial press section that presses the first and second rollers in radial directions of the first and second rollers into pressing contact with one another, to allow torque transmission between the first and second rollers.

The inter-roller radial press section sets a radial pressing force between the first and second rollers so that a maximum distribution condition maximum roller-transmitted torque under an auxiliary driving wheel torque maximum distribution condition, which is determined by the radial pressing force, is below an auxiliary driving wheel maximum distribution torque based on an assumption that a maximum torque is inputted to the driving force distribution device while the auxiliary driving wheel torque maximum distribution condition is maintained.

DETAILED DESCRIPTION

In the driving force distribution device according to the present invention described above, a part of torque to the main driving wheel is directed from the first roller through the second roller to the auxiliary driving wheel, so as to drive both of the main and auxiliary driving wheels. The feature that a maximum distribution condition maximum roller-transmitted torque under an auxiliary driving wheel torque maximum distribution condition, which is determined by the inter-roller radial pressing force, is below an auxiliary driving wheel maximum distribution torque based on an assumption that a maximum torque is inputted to the driving force distribution device while the auxiliary driving wheel torque maximum distribution condition is maintained, produces the following operations and effects.

Namely, a large torque beyond the maximum distribution condition maximum roller-transmitted torque up to the auxiliary driving wheel maximum distribution torque, i.e. a larger torque than necessary for actual use environments, is prevented from being directed to the auxiliary driving wheel. Accordingly, it becomes unnecessary to design the driving system of the auxiliary driving wheel to bear such a large torque. Namely, it is sufficient to set the strength of the driving system in a range needed for actual use, so that the problems about unnecessary costs and weight increase can be solved.

Figure 1:
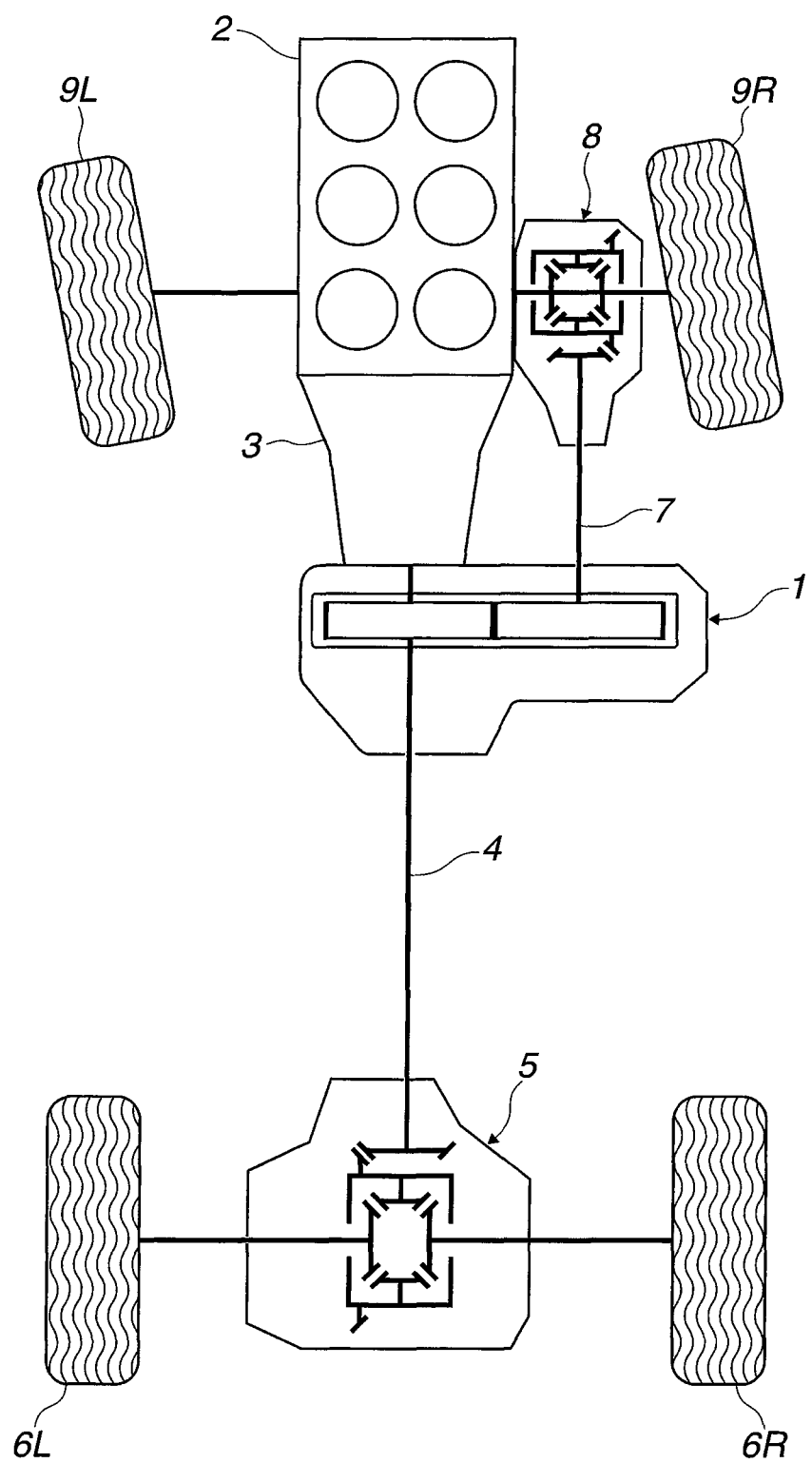
FIG. 1 is a schematic plan view from above a four wheel drive vehicle, showing a powertrain of the four wheel drive vehicle which is provided with a driving force distribution device according to a first embodiment of the present invention.
Figure 2:
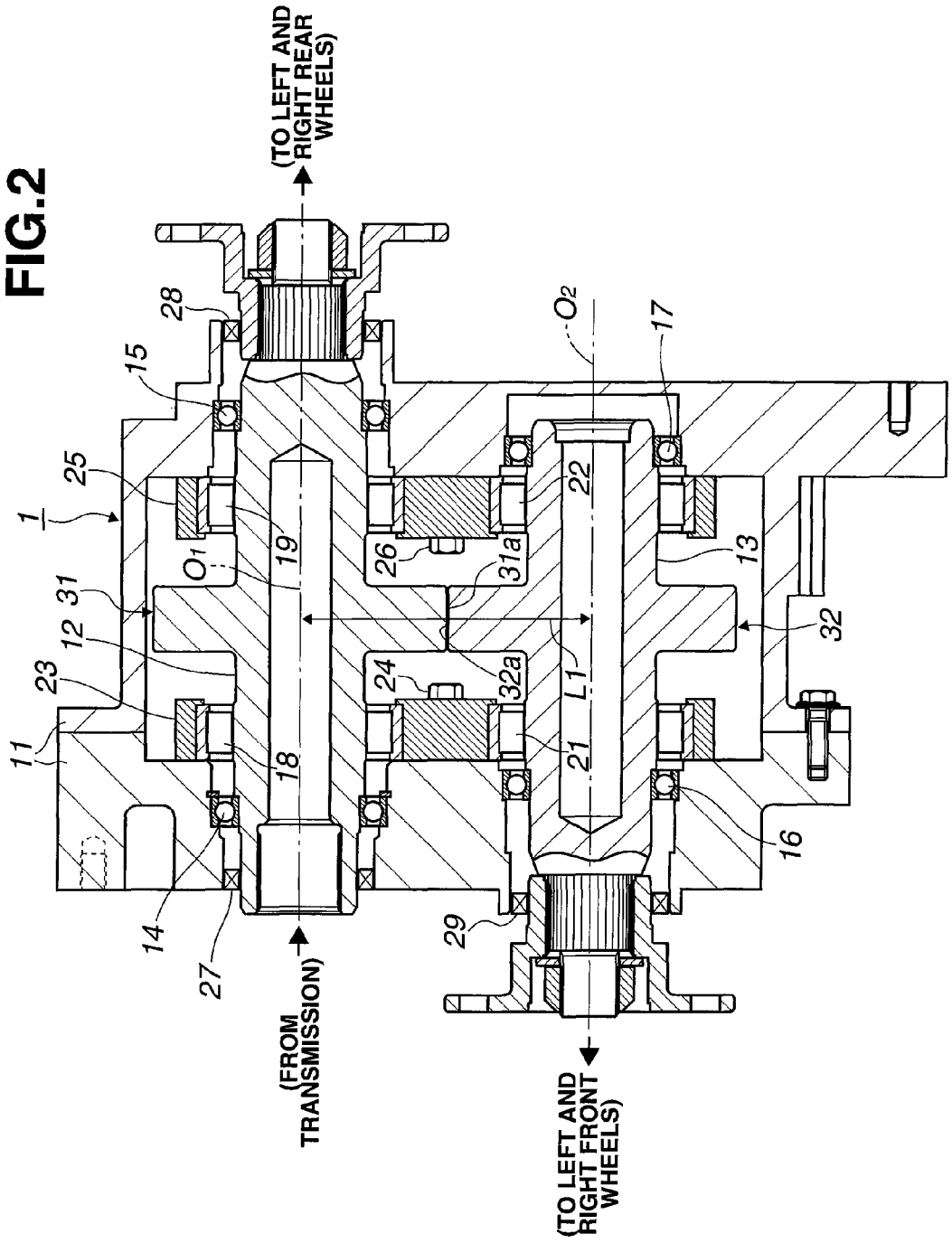
FIG. 2 is a side sectional view of the driving force distribution device of FIG. 1.
Figure 3:
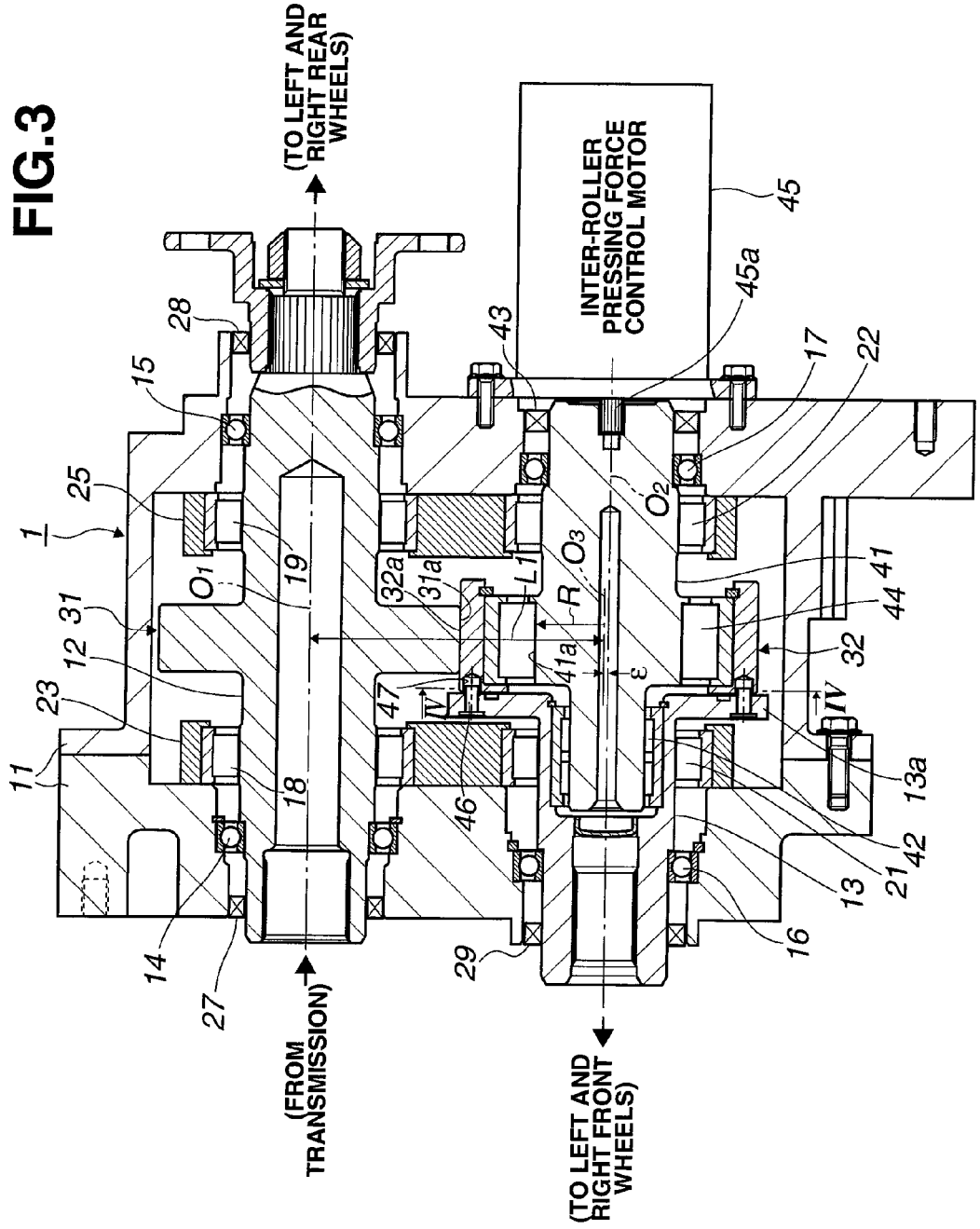
FIG. 3 is a side sectional view similar to FIG. 2, of a driving force distribution device according to a second embodiment of the present invention.
Figure 4:
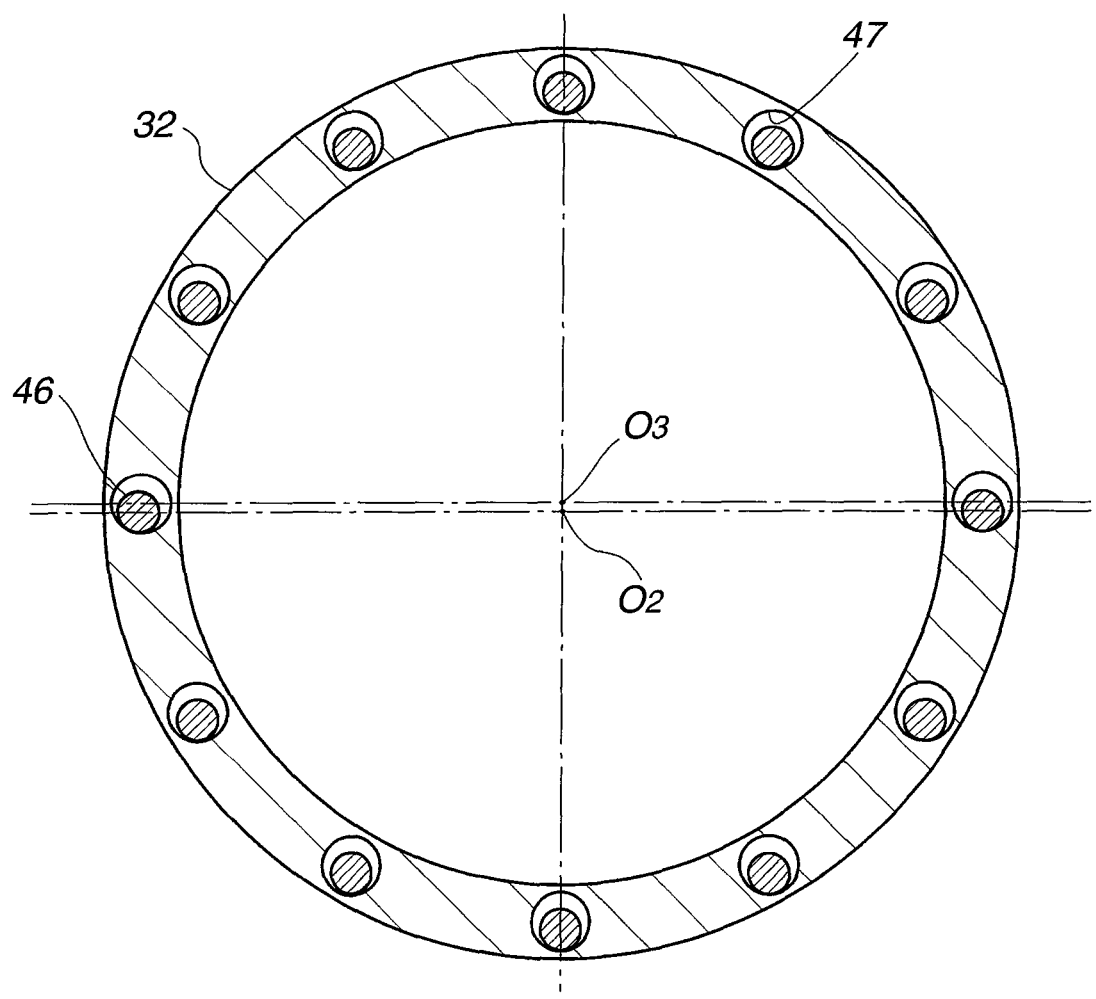
FIG. 4 is a sectional view taken along the line IV-IV and viewed in the direction of an arrow in FIG. 3, showing a driving force transmitting section from a second roller to an output shaft.
Figure 5:
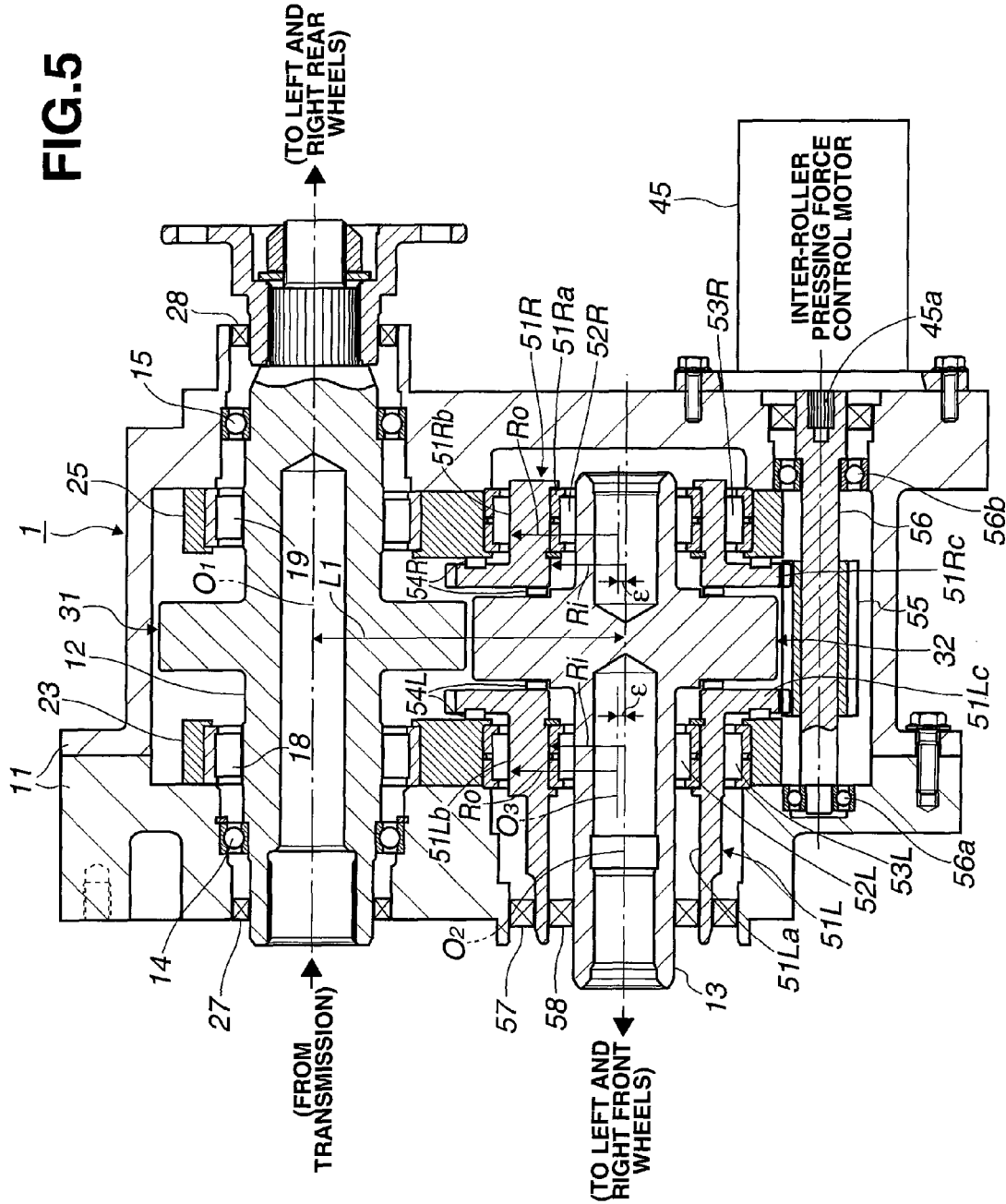
FIG. 5 is a side sectional view similar to FIG. 3, of a driving force distribution device according to a third embodiment of the present invention.
Figure 6:
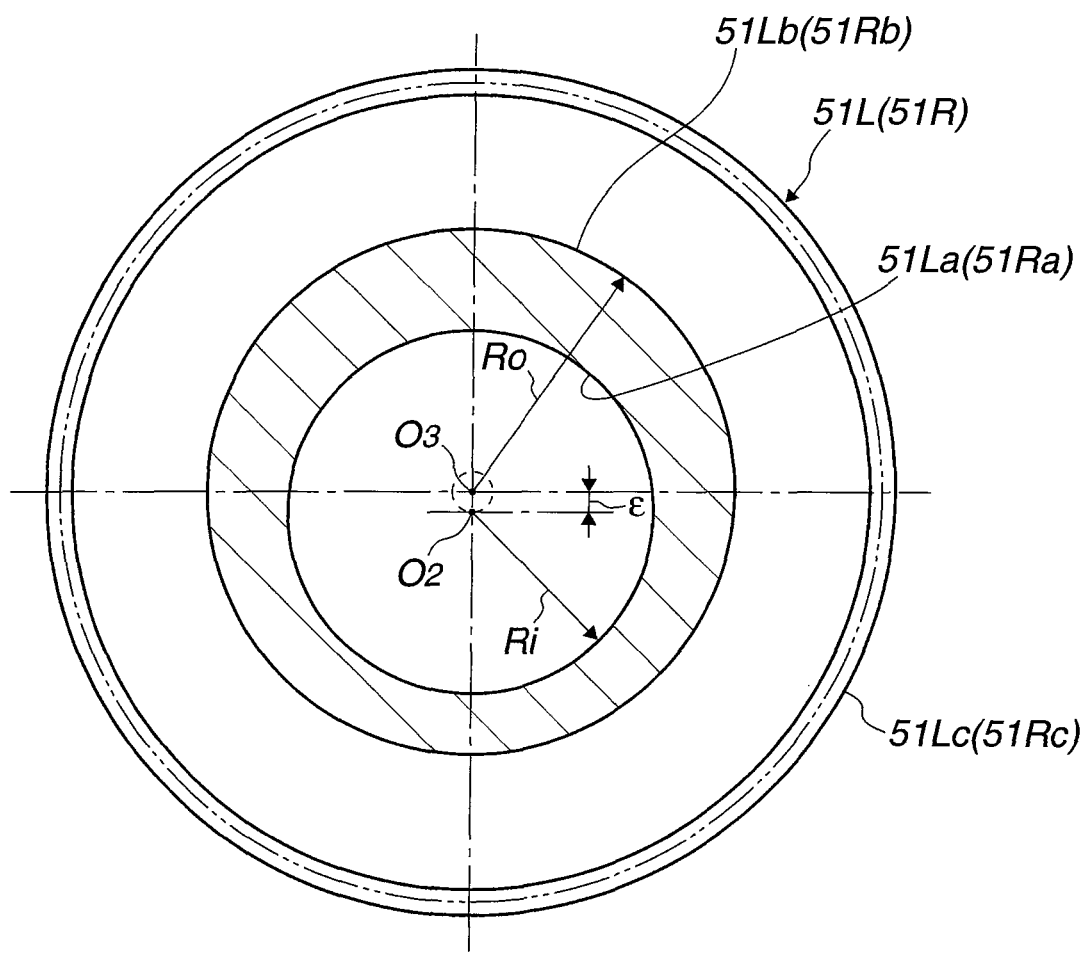
FIG. 6 is a sectional view of a crankshaft employed in the driving force distribution device according to the third embodiment.
Figure 7:
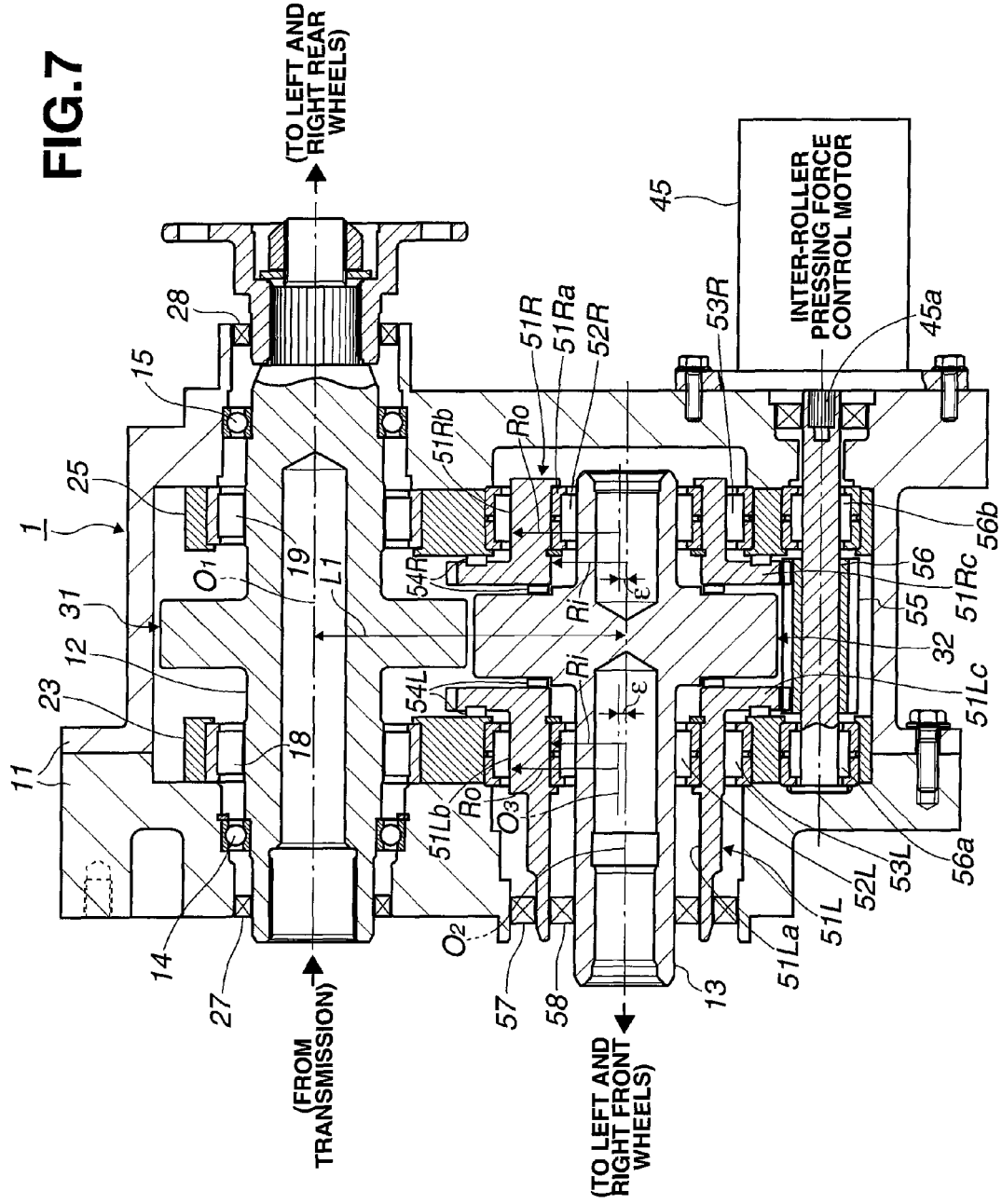
FIG. 7 is a side sectional view similar to FIG. 5, of a driving force distribution device according to a fourth embodiment of the present invention.
Figure 8:
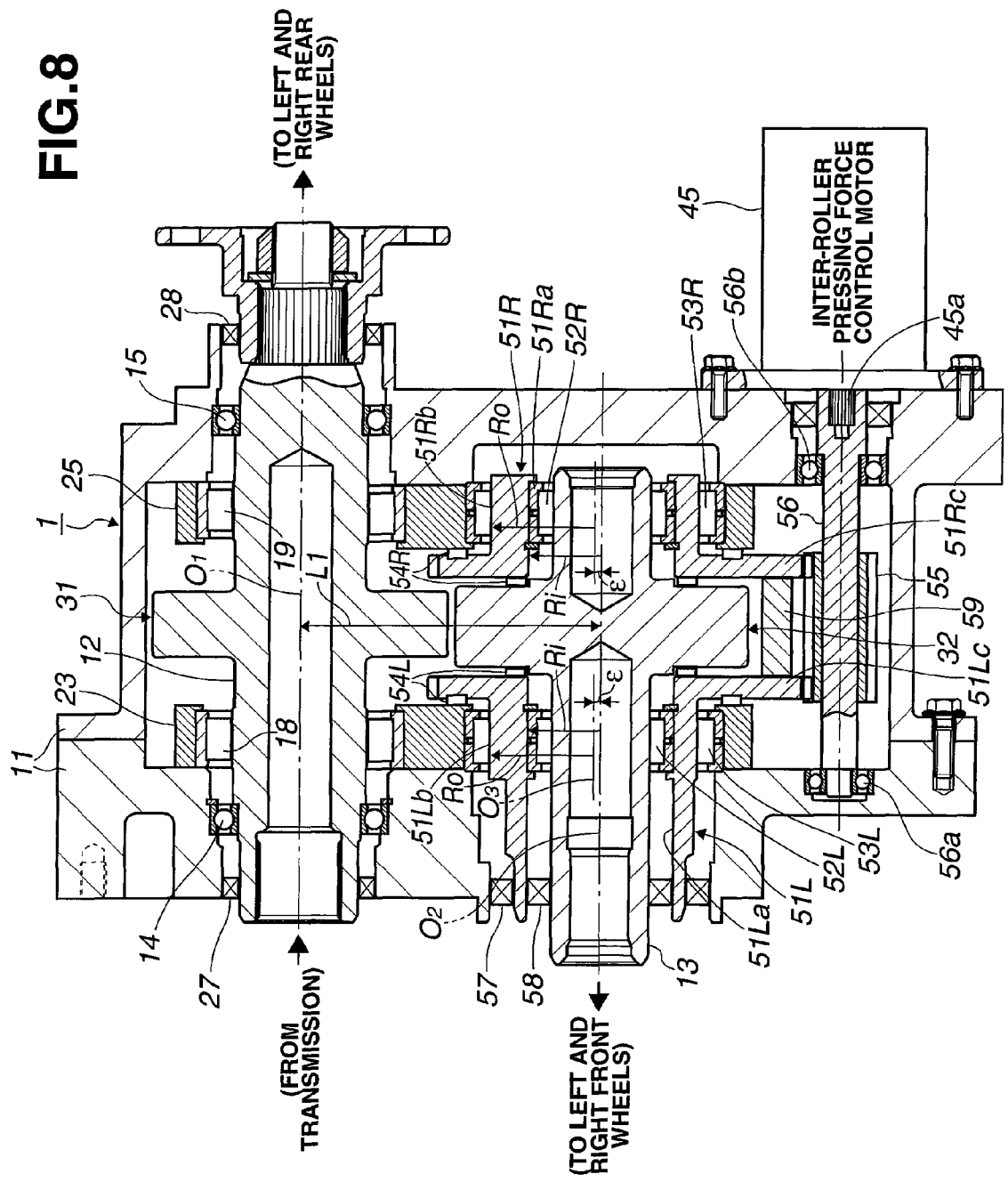
FIG. 8 is a side sectional view similar to FIG. 5, of a driving force distribution device according to a fifth embodiment of the present invention.

The following describes modes of carrying out the present invention, with reference to a first embodiment shown in FIGS. 1 and 2, a second embodiment shown in FIGS. 3 and 4, a third embodiment shown in FIGS. 5 and 6, a fourth embodiment shown in FIG. 7, and a fifth embodiment shown in FIG. 8.

<First Embodiment> FIG. 1 is a schematic plan view from above a four wheel drive vehicle, showing a powertrain of the four wheel drive vehicle which is provided with a driving force distribution device 1 according to a first embodiment of the present invention. The four wheel drive vehicle of FIG. 1 is based on a rear wheel drive vehicle in which rotation from an engine 2 is shifted by a transmission 3, and then transmitted through a rear propeller shaft 4 and a rear final drive unit 5 to left and right rear wheels 6L, 6R, and constructed so that a part of torque to left and right rear wheels (main driving wheels) 6L, 6R is transmitted by driving force distribution device 1 through a front propeller shaft 7 and a front final drive unit 8 to left and right front wheels (auxiliary driving wheels) 9L, 9R, thus achieving four wheel driving.

Driving force distribution device 1 is thus configured to set torque distribution between left and right rear wheels (main driving wheels) 6L, 6R, and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R. In this embodiment, driving force distribution device 1 is constructed as shown in FIG. 2.

In FIG. 2, an input shaft 12 and an output shaft 13 are arranged to laterally cross in a housing 11, which are parallel to one another. Input shaft 12 is rotatably supported with respect to housing 11 by ball bearings 14, at both ends of input shaft 12. Output shaft 13 is rotatably supported with respect to housing 11 by ball bearings 16, 17 at both ends of output shaft 13. Input shaft 12 is rotatably supported with respect to housing 11 also by roller bearings 18, 19 which are disposed in housing 11. Output shaft 13 is rotatably supported with respect to housing 11 also by roller bearings 21, 22 which are disposed in housing 11.

Accordingly, roller bearings 18, 21, which are positioned within a plane perpendicular to the axes of input shaft 12 and output shaft 13, are held by a common bearing support 23 which is attached to a corresponding inside surface of housing 11 by an arbitrary means such as a bolt 24. Also, roller bearings 19, 22, which are positioned within a plane perpendicular to the axes of input shaft 12 and output shaft 13, are held by a common bearing support 25 which is attached to a corresponding inside surface of housing 11 by an arbitrary means such as a bolt 26.

Both ends of input shaft 12 are made to extend out of housing 11, sealed liquid-tightly by seal rings 27, 28. The left end (in FIG. 2) of input shaft 12 is coupled to an output shaft of transmission 3 (see FIG. 1), and the right end (in FIG. 2) of input shaft 12 is coupled through rear propeller shaft 4 (see FIG. 1) to rear final drive unit 5. The left end (in FIG. 2) of output shaft 13 is made to extend out of housing 11, sealed liquid-tightly by a seal ring 29. The left end of output shaft 13 is coupled through front propeller shaft 7 (see FIG. 1) to front final drive unit 8.

Input shaft 12 is formed integrally with a first roller 31 substantially at the center of input shaft 12 in the axial direction of input shaft 12, wherein first roller 31 is coaxially arranged with input shaft 12. Output shaft 13 is formed integrally with a second roller 32 substantially at the center of output shaft 13 in the axial direction of output shaft 13, wherein second roller 32 is coaxially arranged with output shaft 13. First roller 31 and second roller 32 are positioned within a common plane perpendicular to the axes of input shaft 12 and output shaft 13. The distance between the rotation axis $O_1$ of first roller 31 and the rotation axis $O_2$ of second roller 32 (inter-roller-axis distance between first roller 31 and second roller 32) L1 is set smaller than the sum of the semidiameter of first roller 31 and the semidiameter of second roller 32, so that first roller 31 and second roller 32 are pressed in their radial directions to one another, and the outside surfaces of the rollers are brought into pressing contact at places indicated by symbols 31a, 32a.

Namely, bearing supports 23 and 25 are formed to set the inter-roller-axis distance L1 between first roller 31 and second roller 32 smaller than the sum of the semidiameter of first roller 31 and the semidiameter of second roller 32, and thereby generate a radial pressing force between first roller 31 and second roller 32. The radial pressing force determines a transmissible torque between first roller 31 and second roller 32 (roller-transmitted torque TR). Roller-transmitted torque TR is equal to a value that is proportional to the radial pressing force ((friction coefficient between first roller 31 and second roller 32)×(radial pressing force)). Roller-transmitted torque TR results in an auxiliary driving wheel (left and right front wheel) torque Tf. Bearing supports 23, 25, which determine the inter-roller-axis distance L1 between first roller 31 and second roller 32, correspond to an inter-roller radial press section (inter-roller radial press means) in the present invention.

[Torque Distribution Operation] The following describes operation of the first embodiment shown in FIGS. 1 and 2 and described above. The output torque of transmission 3 is inputted to the left end (in FIG. 2) of input shaft 12. On one hand, the torque is transmitted directly from input shaft 12 through rear propeller shaft 4 and rear final drive unit 5 to left and right rear wheels 6L, 6R (main driving wheels). On the other hand, driving force distribution device 1 directs to output shaft 13 a part of torque to left and right rear wheels 6L, 6R, through first roller 31, frictional contact portions 31a, 32a between first roller 31 and second roller 32, and second roller 32, and then transmits this torque to left and right front wheels (auxiliary driving wheels) 9L, 9R from the left end (in FIG. 2) of output shaft 13 through front propeller shaft 7 and front final drive unit 8. This allows four wheel driving of the vehicle wherein all of left and right rear wheels (main driving wheels) 6L, 6R and left and right front wheels (auxiliary driving wheels) 9L, 9R are driven.

Figure 9:
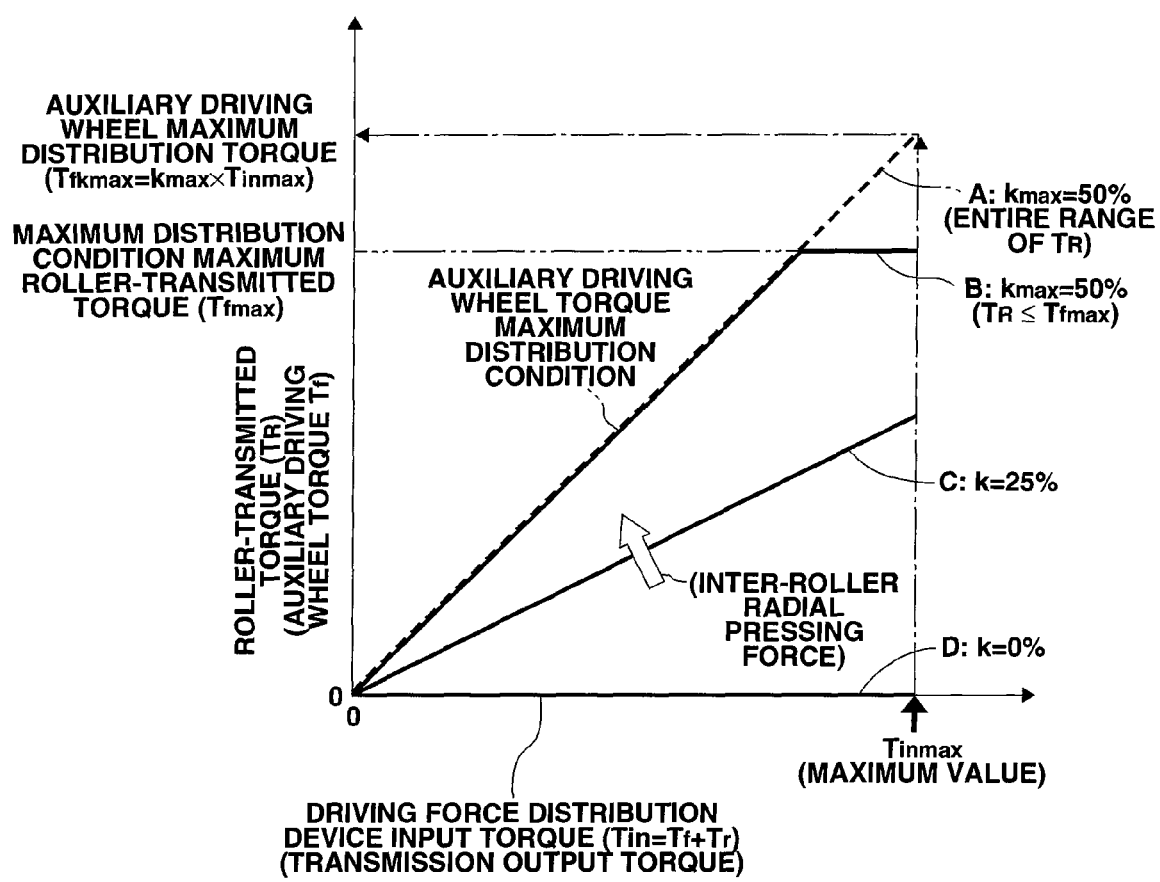
FIG. 9 is a characteristic diagram showing characteristics of change of a roller-transmitted torque (auxiliary driving wheel torque) with respect to an input torque, for the driving force distribution devices according to the first to fifth embodiments.

The following describes torque distribution by driving force distribution device 1, with reference to FIG. 9. FIG. 9 is a diagram showing a relationship between the roller-transmitted torque TR (auxiliary driving wheel (left and right front wheel) torque Tf) and the torque inputted from transmission 3 to driving force distribution device 1 (driving force distribution device input torque, transmission output torque) Tin. As described above, in the present embodiment, the four wheel drive vehicle is based on the rear wheel drive vehicle. Accordingly, if the left and right front wheel (auxiliary driving wheel) torque Tf is set larger than the left and right rear wheel (main driving wheel) torque Tr, for example, a torque distribution ratio for left and right front wheels kmax is set to 60% so that the torque distribution ratio for left and right front wheels is equal to 60% and the torque distribution ratio for left and right rear wheels is equal to 40%, then the maximum value of the front wheel cornering force is unnecessarily small, which adversely affects the cornering performance of the vehicle.

In this embodiment, the left and right front wheel torque distribution ratio kmax is set to 50% so that the left and right front wheel torque distribution ratio is equal to 50% and the left and right rear wheel torque distribution torque is equal to 50%, and so that the left and right front wheel torque Tf is below the left and right rear wheel torque Tf. In such a case where the front and rear wheel torque distribution ratio is 50:50, the diameter D1 of first roller 31, the diameter D2 of second roller 32, the gear ratio it of rear final drive unit 5, and the gear ratio if of front final drive unit 8 are set as D1×ir=D2×if, so as not to cause a difference in rotation between the front and rear wheels. If the inter-roller-axis distance L1 is set large so that the radial pressing force between first roller 31 and second roller 32 (roller-transmitted torque TR) prevents slippage between the rollers in the entire range of driving force distribution device input torque Tin, in contrast to the present embodiment, the roller-transmitted torque TR changes with respect to driving force distribution device input torque Tin, showing characteristics indicated by a broken line A in FIG. 9.

However, if the auxiliary driving wheel torque distribution ratio kmax is constant in the entire torque range as indicated by the broken line A in FIG. 9, the main driving wheel torque Tr increases naturally, and the auxiliary driving wheel torque Tf also increases depending on the auxiliary driving wheel torque distribution ratio kmax, in the entire torque range, as the driving force distribution device input torque Tin increases.

Accordingly, when the maximum value Tinmax of the driving force distribution device input torque Tin (torque when the torque of engine 2 is maximum, and the transmission gear ratio of transmission 3 is one corresponding to the lowest gear) is inputted with the auxiliary driving wheel torque distribution ratio kmax=50%, then the auxiliary driving wheel (left and right front wheel) torque Tf which is large and equal to an auxiliary driving wheel maximum distribution torque Tfkmax=kmax×Tinmax based on the auxiliary driving wheel torque distribution ratio kmax=50% and the maximum value Tinmax of driving force distribution device input torque Tin, is directed to the auxiliary driving wheels.

Although it is however unnecessary to direct such a large auxiliary driving wheel maximum distribution torque Tfkmax to the auxiliary driving wheels under actual use environments, an unnecessarily large torque is directed to the auxiliary driving wheels. Since it is possible that such an unnecessarily large torque is directed to the auxiliary driving wheels, the driving system of the auxiliary driving wheels must be designed to resist such a large torque. The strength of the driving system must be enhanced higher than necessary for actual use. This causes problems of unnecessary costs, and weight increase.

Accordingly, in the present embodiment, the inter-roller-axis distance L1 between first roller 31 and second roller 32 is determined so as to determine the radial pressing force between first roller 31 and second roller 32 so that the maximum value of the roller-transmitted torque at the auxiliary driving wheel torque distribution ratio kmax=50% (maximum roller-transmitted torque) Tfmax, is smaller than the auxiliary driving wheel maximum distribution torque Tfkmax. As a result, as indicated by a solid line B in FIG. 9, the roller-transmitted torque TR becomes a product of the auxiliary driving wheel torque distribution ratio kmax=50% and the driving force distribution device input torque Tin (kmax×Tin), in the range of torque below the auxiliary driving wheel maximum distribution torque Tfkmax. In the range of torque above the auxiliary driving wheel maximum distribution torque Tfkmax, the roller-transmitted torque TR is limited to the maximum distribution condition maximum roller-transmitted torque Tfmax, because a true auxiliary driving wheel torque distribution ratio k is smaller than 50% due to slippage between the rollers, although the auxiliary driving wheel torque distribution ratio kmax=50%.

In this embodiment, the auxiliary driving wheel torque distribution ratio kmax is equal to a constant value of 50%, because the inter-roller-axis distance L1 between first roller 31 and second roller 32 is constant. Accordingly, in this embodiment, the condition of auxiliary driving wheel torque distribution ratio kmax=50% corresponds to auxiliary driving wheel torque maximum distribution condition, and the maximum roller-transmitted torque Tfmax corresponds to maximum distribution condition maximum roller-transmitted torque. The auxiliary driving wheel maximum distribution torque Tfkmax is a product of the maximum value of the auxiliary driving wheel torque distribution ratio (maximum auxiliary driving wheel distribution ratio under maximum auxiliary driving wheel distribution condition) kmax=50% and the maximum value Tinmax of the driving force distribution device input torque Tin. The auxiliary driving wheel maximum distribution torque Tfkmax corresponds to a value based on an assumption that the maximum torque (maximum value of driving force distribution device input torque Tin) Tinmax is inputted to the driving force distribution device while the auxiliary driving wheel torque maximum distribution condition kmax=50% is maintained.

Accordingly, a larger torque than required to be directed to the auxiliary driving wheels under actual use environments is prevented from being transmitted to the auxiliary driving wheels, so that it becomes unnecessary to design the driving system of the auxiliary driving wheels in consideration of such a large torque. In this way, it is unnecessary to design the driving system of the auxiliary driving wheels so that the strength of the driving system is higher than necessary for actual use, and thereby it is possible to solve the problems of unnecessary costs and weight increase described above.

In consideration of the purpose described above, it is naturally preferable that the maximum distribution condition maximum roller-transmitted torque Tfmax is conformed to such a torque capacity that the maximum torque to be directed to the auxiliary driving wheels in actual use environments can be just transmitted.

In addition, when driving force distribution device 1 determines driving force distribution between left and right rear wheels (main driving wheels) 6L, 6R and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R as described above, the driving force distribution device 1 prevents the first roller 31 from transmitting to the second roller 32 a torque that is above the range of roller-transmitted torque TR according to the radial pressing force between first roller 31 and second roller 32 by the prepressing.

Figure 10:
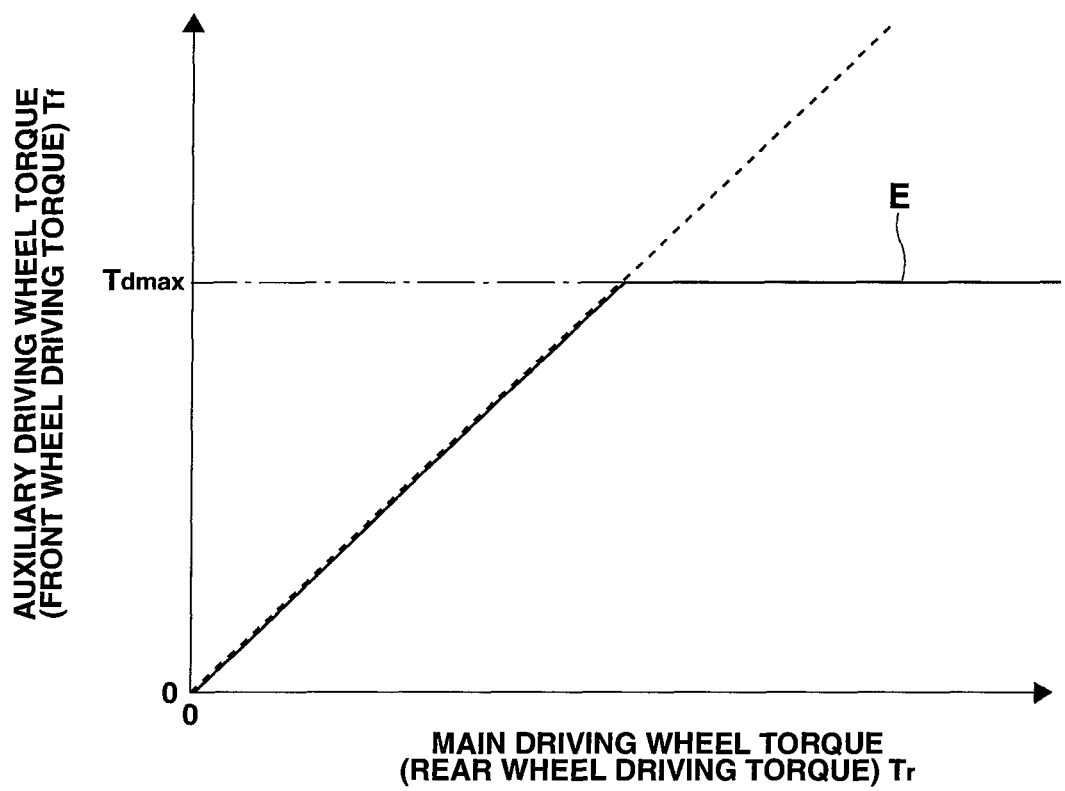
FIG. 10 is a characteristic diagram showing as an example characteristics of driving force distribution between front and rear wheels according to the driving force distribution device shown in FIG. 2.

Accordingly, as indicated by Tdmax in FIG. 10, the upper limit of the torque to the left and right front wheels (auxiliary driving wheels) is set to a value corresponding to the radial pressing force between first roller 31 and second roller 32, so that the driving force distribution between left and right rear wheels (main driving wheels) 6L, 6R and left and right front wheels (auxiliary driving wheels) 9L, 9R has characteristics as indicated by a solid line E in FIG. 10.

Accordingly, even if the input torque to driving force distribution device 1 becomes large, the torque to the left and right front wheels (auxiliary driving wheels) does not exceed the upper limit value Tdmax described above. Therefore, driving force distribution device 1 according to the present embodiment can be used as a driving force distribution device for a four wheel drive vehicle in which the driving system of the left and right front wheels (auxiliary driving wheels) must be compact to satisfy the demand of compactness of the vehicle, wherein it is unnecessary to care about whether the strength of the driving system of the left and right front wheels (auxiliary driving wheels) is short.

<Second Embodiment> FIG. 3 shows a second embodiment of the present invention in which driving force distribution device 1 is configured so that the inter-roller-axis distance L1 between first roller 31 and second roller 32 is arbitrarily set so as to arbitrarily set the radial pressing force between first roller 31 and second roller 32. For this purpose, output shaft 13 is shortened as compared to the embodiment shown in FIG. 2, and rotatably supported with respect to housing 11 only by ball bearing 16 and roller bearing 21 which are similar to those in FIG. 2.

In FIG. 3, the left end of output shaft 13 which extends out of housing 11 is coupled to front final drive unit 8 through front propeller shaft 7, as in the embodiment described above. In FIG. 3, a crankshaft 41 is arranged to face the right end (inside end) of output shaft 13 which is located in housing 11.

The left end (in FIG. 3) of crankshaft 41 is fitted to the inside end of output shaft 13 though a needle bearing 42 so that the left end (in FIG. 3) of crankshaft 41 is rotatably supported with respect to housing 11 through output shaft 13, and output shaft 13 and crankshaft 41 are allowed to rotate with respect to one another.

The right end (in FIG. 3) of crankshaft 41 is rotatably supported with respect to housing 11 by ball bearing 17 and roller bearing 22 which are similar to those in FIG. 2. The right end (in FIG. 3) of crankshaft 41 is exposed to outside from housing 11, sealed liquid-tightly by a seal ring 43.

Crankshaft 41 includes an eccentric shaft portion 41a between bearing portions at both ends, where the eccentric shaft portion 41a has a semidiameter R. Eccentric shaft portion 41a has a central axis $O_3$ that is arranged with an offset of $\epsilon$ from a central axis $O_2$ of crankshaft 41 (output shaft 13), and is positioned in a common plane perpendicular to the axes of input shaft 12 and output shaft 13 together with first roller 31 on input shaft 12. Second roller 32 is rotatably attached through a roller bearing 44 to the eccentric shaft portion 41a of crankshaft 41, although the position of second roller 32 in the axial direction is determined.

Accordingly, the rotation axis of second roller 32 is identical to the central axis $O_3$ of eccentric shaft portion 41a. By adjusting the inter-roller-axis distance L1 between first roller 31 and second roller 32 by making the second roller rotation axis $O_3$ (the central axis of eccentric shaft portion 41a) revolve around the crankshaft rotation axis (output shaft rotation axis) $O_2$ by control of the rotational position of crankshaft 41, the radial pressing force between first roller 31 and second roller 32 (roller-transmitted torque TR between the first and second rollers) can be arbitrarily controlled.

Accordingly, an inter-roller pressing force control motor 45 is attached to housing 11 so that an output shaft 45a of motor 45 is drivingly coupled, for example, by serration coupling, to the end surface of crankshaft 41 that is exposed from housing 11. In this embodiment, crankshaft 41 and inter-roller pressing force control motor 45 for adjusting the inter-roller-axis distance L1 between first roller 31 and second roller 32 cooperate with bearing supports 23, 25 to constitute an inter-roller radial press section in the present invention.

When second roller 32 is pressed to first roller 31 in the radial direction under control of motor 45 so as to bring the outside surfaces of rollers 31, 32 into pressing contact with one another at places indicated by symbols 31a, 32a, torque can be transmitted from first roller 31 to second roller 32 through the pressing contact portions 31a, 32a. In order to allow rotation of the rotated second roller 32 to be transmitted to output shaft 13, output shaft 13 is formed integrally with a flange portion 13a at the inside end, and the diameter of the flange portion 13a is set so that the flange portion 13a faces the second roller 32 in the axial direction.

A plurality of driving pins 46 are fixed to the output shaft flange portion 13a that faces the second roller 32, where driving pins 46 project toward second roller 32. Driving pins 46 are arranged along a common circle at even intervals as shown in FIG. 4. The end surface of second roller 32 facing the output shaft flange portion 13a is formed with a plurality of holes 47 through which driving pins 46 are inserted respectively, in order to allow torque transmission from second roller 32 to output shaft 13 (flange portion 13a). Driving pin insertion hole 47 has the form of a circular hole having a larger diameter than the diameter of driving pin 46, as clearly shown in FIG. 4. The diameter of driving pin insertion hole 47 is set large enough to allow torque transmission from second roller 32 to output shaft 13 (flange portion 13a), while absorbing the eccentricity E between the rotation axis $O_2$ of output shaft 13 and the rotation axis $O_3$ of second roller 32.

The second embodiment is constructed similar to the first embodiment shown in FIG. 2, except the foregoing. Corresponding portions are only shown with the same symbols, without repetition of the explanation.

[Torque Distribution Control] The following describes torque distribution control of the second embodiment shown in FIGS. 3 and 4 and described above. On one hand, the torque from transmission 3 to input shaft 12 is transmitted directly from input shaft 12 through rear propeller shaft 4 (see FIG. 1) and rear final drive unit 5 (see FIG. 1) to left and right rear wheels 6L, 6R (main driving wheels), as in the first embodiment shown in FIG. 2.

On the other hand, driving force distribution device 1 according to this embodiment directs to output shaft 13 a part of torque to left and right rear wheels 6L, 6R, through first roller 31, frictional contact portions 31a, 32a between first roller 31 and second roller 32, second roller 32, driving pins 46, and output shaft flange portion 13a, and then transmits this torque to left and right front wheels (auxiliary driving wheels) 9L, 9R from the left end (in FIG. 3) of output shaft 13 through front propeller shaft 7 (see FIG. 1) and front final drive unit 8 (see FIG. 1). This allows four wheel driving of the vehicle wherein all of left and right rear wheels (main driving wheels) 6L, 6R and left and right front wheels (auxiliary driving wheels) 9L, 9R are driven.

While doing so, driving force distribution device 1 according to this embodiment can adjust the inter-roller-axis distance L1 between first roller 31 and second roller 32 by controlling the rotational position of crankshaft 41 about the central axis $O_2$ by means of inter-roller pressing force control motor 45 so that the second roller rotation axis $O_3$ (the central axis of eccentric shaft portion 41a) revolves around the crankshaft rotation axis (output shaft rotation axis) $O_2$.

The control of changing the inter-roller-axis distance L1 between first roller 31 and second roller 32 allows control of changing the radial pressing force of second roller 32 to first roller 31, and thereby makes it possible to arbitrarily control the roller-transmitted torque TR between the first and second rollers.

According to the control of the radial pressing force between the first and second rollers 31, 32 (roller-transmitted torque TR), as the inter-roller-axis distance L1 is increased from a control minimum value, namely, as the radial pressing force between the first and second rollers (roller-transmitted torque TR) is reduced from a control maximum value, the auxiliary driving wheel torque distribution ratio decreases from the maximum value kmax=50%, so that characteristics of change of the roller-transmitted torque TR (auxiliary driving wheel (left and right front wheel) torque Tf) with respect to driving force distribution device input torque Tin changes from the characteristics indicated by the solid line B for kmax=50% in FIG. 9 (described in detail below), through characteristics indicated by a solid line C for k=25% in FIG. 9, to characteristics indicated by a solid line D for k=0% in FIG. 9 (two wheel driving condition). The characteristics indicated by the solid line D for k=0% in FIG. 9 is characteristics when the inter-roller-axis distance L1 is larger than the sum of the semidiameter of first roller 31 and the semidiameter of second roller 32 (first roller 31 and second roller 32 are out of contact with one another) so that the radial pressing force between rollers 31, 32 (roller-transmitted torque TR) is equal to zero.

Conversely, as the inter-roller-axis distance L1 is reduced from a control maximum value to the control minimum value, namely, as the radial pressing force between the first and second rollers 31, 32 (roller-transmitted torque TR) is increased from zero to the control maximum value, the characteristics of change of the roller-transmitted torque TR (auxiliary driving wheel (left and right front wheel) torque Tf) with respect to driving force distribution device input torque Tin changes from the characteristics indicated by the solid line D for k=0% in FIG. 9, through the characteristics indicated by the solid line C for k=25% in FIG. 9, to the characteristics indicated by the solid line B for kmax=50% in FIG. 9.

The control minimum value of the inter-roller-axis distance L1, and the control maximum value of the inter-roller radial pressing force (roller-transmitted torque TR) are values with which the auxiliary driving wheel torque distribution ratio is equal to the maximum value kmax=50% (auxiliary driving wheel torque maximum distribution condition). If the control maximum value of the inter-roller radial pressing force (roller-transmitted torque TR) is large so as to prevent slippage between the rollers in the entire range of driving force distribution device input torque Tin in contrast to the present embodiment, the roller-transmitted torque TR changes with respect to driving force distribution device input torque Tin, showing characteristics indicated by the broken line A in FIG. 9.

However, in the case where the auxiliary driving wheel torque distribution ratio kmax is constant in the entire torque range so that the roller-transmitted torque TR is unlimited as indicated by the broken line A in FIG. 9 in contrast to this embodiment, when the maximum value Tinmax of the driving force distribution device input torque is inputted with the auxiliary driving wheel torque distribution ratio kmax=50%, then the auxiliary driving wheel (left and right front wheel) torque Tf which is large and equal to an auxiliary driving wheel maximum distribution torque Tfkmax=kmax×Tinmax based on the auxiliary driving wheel torque distribution ratio kmax=50% and the maximum value Tinmax of driving force distribution device input torque Tin, is directed to the auxiliary driving wheels.

Accordingly, although it is unnecessary to direct such a large auxiliary driving wheel maximum distribution torque Tfkmax to the auxiliary driving wheels under actual use environments, the driving system of the auxiliary driving wheels must be designed in consideration of this fact, and the strength of the driving system must be enhanced higher than necessary. This causes problems of unnecessary costs, and weight increase. Accordingly, in the present embodiment, the control maximum value of the radial pressing force between first roller 31 and second roller 32 (the control minimum value of the inter-roller-axis distance L1) is determined so that the maximum value of the roller-transmitted torque at the auxiliary driving wheel torque maximum distribution condition kmax=50% (maximum distribution condition maximum roller-transmitted torque) Tfmax which is determined by the control maximum value of the inter-roller radial pressing force (the control minimum value of the inter-roller-axis distance L1) is smaller than the auxiliary driving wheel maximum distribution torque Tfkmax, as indicated by the solid line B in FIG. 9.

As a result, when the inter-roller radial pressing force is set to the control maximum value (the inter-roller-axis distance L1 is set to the control minimum value), the roller-transmitted torque TR becomes a product of the maximum value of the auxiliary driving wheel torque distribution ratio (auxiliary driving wheel torque distribution ratio under auxiliary driving wheel maximum distribution condition) kmax=50% and the driving force distribution device input torque Tin (kmax× Tin), in the range of torque below the auxiliary driving wheel maximum distribution torque Tfkmax, as indicated by the solid line B in FIG. 9. In the range of torque above the auxiliary driving wheel maximum distribution torque Tfkmax, the roller-transmitted torque TR is limited to the maximum distribution condition maximum roller-transmitted torque Tfmax, because a true auxiliary driving wheel torque distribution ratio k is smaller than 50% due to slippage between the rollers, although under the auxiliary driving wheel torque maximum distribution condition kmax=50%, as indicated by the solid line B in FIG. 9.

The auxiliary driving wheel maximum distribution torque Tfkmax is equal to a product of the maximum value of the auxiliary driving wheel torque distribution ratio (auxiliary driving wheel torque distribution ratio under auxiliary driving wheel maximum distribution condition) kmax=50% and the maximum value of the driving force distribution device input torque Tinmax, and corresponds to a value based on an assumption that the maximum torque (maximum value of driving force distribution device input torque Tin) Tinmax is inputted to the driving force distribution device while the auxiliary driving wheel torque maximum distribution condition kmax=50% is maintained.

Accordingly, a larger torque than required to be directed to the auxiliary driving wheels under actual use environments is prevented from being transmitted to the auxiliary driving wheels, so that it becomes unnecessary to design the driving system of the auxiliary driving wheels in consideration of such a large torque. In this way, it is unnecessary to design the driving system of the auxiliary driving wheels so that the strength of the driving system is higher than necessary for actual use, and thereby it is possible to solve the problems of unnecessary costs and weight increase described above.

In consideration of the purpose described above, it is naturally preferable that the maximum distribution condition maximum roller-transmitted torque Tfmax is conformed to such a torque capacity that the maximum torque to be directed to the auxiliary driving wheels in actual use environments can be just transmitted.

In addition, when driving force distribution device 1 according to this embodiment determines driving force distribution between left and right rear wheels (main driving wheels) 6L, 6R and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R as described above, the driving force distribution device 1 prevents the first roller 31 from transmitting to the second roller 32 a torque that is above the range of roller-transmitted torque TR according to the radial pressing force of second roller 32 to first roller 31.

Accordingly, as indicated by Tdmax in FIG. 10, the upper limit of the torque to the left and right front wheels (auxiliary driving wheels) is set to a value corresponding to the radial pressing force between first roller 31 and second roller 32, so that the driving force distribution between left and right rear wheels (main driving wheels) 6L, 6R and left and right front wheels (auxiliary driving wheels) 9L, 9R has characteristics as indicated by a solid line E in FIG. 10. Accordingly, even if the input torque to driving force distribution device 1 becomes large, the torque to the left and right front wheels (auxiliary driving wheels) does not exceed the upper limit value Tdmax described above. Therefore, driving force distribution device 1 according to the present embodiment can be used as a driving force distribution device for a four wheel drive vehicle in which the driving system of the left and right front wheels (auxiliary driving wheels) must be compact to satisfy the demand of compactness of the vehicle, wherein it is unnecessary to care about whether the strength of the driving system of the left and right front wheels (auxiliary driving wheels) is short.

In cases where the various operations and effects described above are achieved by the radial displacement of second roller 32 as in this embodiment, when both of a two wheel drive type and a four wheel drive type are set for a single vehicle model, main driving wheel (left and right rear wheels 6L, 6R) side components can be commonly used by both of the two wheel drive type and four wheel drive type. For the four wheel drive type, the driving force distribution device 1 can be constructed only by adding auxiliary driving wheel (left and right front wheels 9L, 9R) side components. This makes it possible to achieve commonality of components of driving force distribution device 1 between the two wheel drive type and four wheel drive type, and thereby achieve cost reduction.

In cases where second roller 32 is rotatably supported on eccentric shaft portion 41a of crankshaft 41, and the radial displacement of second roller 32 is caused by rotational displacement of crankshaft 41 as in the present embodiment, it is possible to easily and accurately control the rotational position of crankshaft 41 by means of motor 45 which is highly-controllable and whose control accuracy is high.

In any cases, in order to achieve the operations and effects described above in this embodiment, it is naturally necessary to determine the inter-roller-axis distance between input shaft 12 and output shaft 13 (distance between the rotation axes $O_1$, $O_2$) and the eccentricity E of eccentric shaft portion 41a so that the torque upper limit Tdmax (see FIG. 10) when the rotation axis $O_3$ of second roller 32 is the closest to the rotation axis $O_1$ of input shaft 12 so as to minimize the inter-roller-axis distance L1 is below the strength of the driving system of left and right front wheels (auxiliary driving wheels) 9L, 9R.

It is preferable to make the radial pressing force between first roller 31 and second roller 32 become about zero or cause a clearance between first roller 31 and second roller 32, just when the rotation axis $O_3$ of second roller 32 is the farthest from the rotation axis $O_1$ of input shaft 12 so as to maximize the inter-roller-axis distance L1.

In the former case where the maximum value of the inter-roller-axis distance L1 between first roller 31 and second roller 32 is determined so that the radial pressing force between first roller 31 and second roller 32 becomes about zero, it is possible to achieve a two wheel driving condition by setting the torque distribution to left and right front wheels (auxiliary driving wheels) 9L, 9R to be completely zero, according to the operating state.

In the latter case where the maximum value of the inter-roller-axis distance L1 between first roller 31 and second roller 32 is determined so as to cause a clearance between first roller 31 and second roller 32, even when a four wheel drive vehicle is moved by a wrecker under condition that front wheels or rear wheels of the four wheel drive vehicle are in contact with the ground, thereby causing a difference in rotation between the front wheels and rear wheels, the differential rotation can be absorbed by the clearance between first roller 31 and second roller32. The vehicle can be thus moved by a wrecker under condition that the front wheels or rear wheels are in contact with the ground, without problems of heating, wear, etc. in driving force distribution device 1.

Incidentally, in case of a typical conventional driving force distribution device, when a four wheel drive vehicle is moved by a wrecker under condition that front wheels or rear wheels of the four wheel drive vehicle are in contact with the ground, thereby causing a difference in rotation between the front wheels and rear wheels, the differential rotation causes heat in a driving force transmitting section, or causes wear in some places. Accordingly, the vehicle cannot be moved by a wrecker under condition that the front wheels or rear wheels are in contact with the ground.

In the foregoing, the invention is applied to a driving force distribution device where a rear wheel drive vehicle is used as a base vehicle, and torque distribution between front wheels and rear wheels is set by splitting and outputting a part of torque to the front wheels. However, the concept of the present invention described above may be naturally applied also to a driving force distribution device where a front wheel drive vehicle is used as a base vehicle, and torque distribution between front wheels and rear wheels is set by splitting and outputting a part of torque to the rear wheels.

In such a case where a front wheel drive vehicle is used as a base vehicle, it is preferable to actively distribute a driving force to rear wheels (auxiliary driving wheels) so that front wheels can produce a large cornering force, in order to bring cornering performance and driving stability of the vehicle into balance. Accordingly, in this case, the diameter D1 of the first roller on the front wheel (main driving wheel) side, the diameter D2 of the second roller on the rear wheel (auxiliary driving wheel) side, the gear ratio if of the front final drive unit, and the gear ratio of the rear final drive unit are set as D1×if>D2×ir, so that the auxiliary driving wheel torque maximum distribution condition corresponds to a characteristic of a more rapid gradient than indicated by the broken line A of kmax=50% in FIG. 9.

By determining the control maximum value of the radial pressing force (roller-transmitted torque TR) between the first roller and second roller (the control minimum value of the inter-roller-axis distance L1) under the characteristic of rapid gradient so that the maximum distribution condition maximum roller-transmitted torque at the auxiliary driving wheel torque maximum distribution condition (kmax=70%) (corresponding to Tfmax in FIG. 9) which is determined by the control maximum value of the inter-roller radial pressing force (roller-transmitted torque TR) is smaller than an auxiliary driving wheel maximum distribution torque corresponding to Tfkmax in FIG. 9, it is possible to achieve operations and effects similar to the second embodiment, also when a front wheel drive vehicle is used as a base vehicle.

Since second roller 32 is rotatably supported on eccentric shaft portion 41a of crankshaft 41, and the radial displacement of second roller 32 is caused by rotational displacement of crankshaft 41 to change the inter-roller-axis distance L1 between first roller 31 and second roller 32 in the second embodiment as described with reference to FIG. 3, it is necessary to couple second roller 32 to output shaft 13 by eccentric coupling as shown in FIG. 4. It is possible to insert the crankshaft 41 through second roller 32 in the axial direction, wherein crankshaft 41 is formed solid. This leads to simple construction, and also makes it possible to easily couple the crankshaft 41 to inter-roller pressing force control motor 45.

[Third Embodiment]FIG. 5 shows a third embodiment of the present invention, in which the crankshaft 41 according to the second embodiment in the form of a solid inner shaft is replaced with crankshafts 51L, 51R in the form of a pair of hollow outer shafts, and the radial displacement of second roller 32 is caused by rotational displacement of crankshafts 51L, 51R, to change the inter-roller-axis distance L1 between first roller 31 and second roller 32.

Accordingly, second roller 32 is formed integrally with output shaft 13, and the hollow crankshafts 51L, 51R are located at both axial ends of second roller 32. Both ends of output shaft 13, which project from both axial ends of second roller 32, are fitted in central holes 51La, 51Ra (semidiameter Ri) of crankshafts 51L, 51R. Bearings 52L, 52R are disposed in the fitting portions so that output shaft 13 is supported in the central holes 51La, 51Ra of crankshafts 51L, 51R for free rotation about the central axis $O_2$ of the central holes 51La, 51Ra.

As clearly shown in FIG. 6, crankshafts 51L, 51R are formed with peripheries 51Lb, 51Rb (semidiameter Ro) that are eccentric with respect to central holes 51La, 51Ra(central axis $O_2$), so that the central axis $O_3$ of eccentric peripheries 51Lb, 51Rb is eccentric with respect to the central axis $O_2$ of central holes 51La, 51Ra by eccentricity ε. Eccentric peripheries 51Lb, 51Rb of crankshafts 51L, 51R are rotatably supported in the respective bearing supports 23, 25 through bearings 53L, 53R. Crankshafts 51L, 51R as well as second roller 32 are positioned in the axial direction by thrust bearings 54L, 54R, respectively.

The ends of crankshafts 51L, 51R that are closer to and face one another are formed integrally with ring gears 51Lc, 51Rc having identical specifications. Ring gears 51Lc, 51Rc are meshed with a common crankshaft driving pinion 55, under condition that crankshafts 51L, 51R are in rotational positions such that the eccentric peripheries 51Lb, 51Rb are aligned with one another in the circumferential direction.

Crankshaft driving pinion 55 is coupled to a pinion shaft 56. Both ends of pinion shaft 56 are rotatably supported with respect to housing 11 by bearings 56a, 56b. The right end of pinion shaft 56 on the right side of FIG. 5 is exposed outside of housing 11. The exposed end surface of pinion shaft 56 is drivingly coupled, for example, by serration coupling, to the output shaft 45a of inter-roller pressing force control motor 45 that is attached to housing 11.

Accordingly, it is possible to arbitrarily control the radial pressing force of second roller 32 to first roller 31 (roller-transmitted torque between rollers TR) by controlling the rotational positions of crankshafts 51L, 51R through the pinion 55 and ring gears 51Lc, 51Rc by inter-roller pressing force control motor 45 so that the rotation axis $O_2$ of output shaft 13 and second roller 32 revolves along a locus circle indicated by a broken line in FIG. 6, and thereby the inter-roller-axis distance L1 changes. In this way, inter-roller pressing force control motor 45, pinion 55, and crankshafts 51L, 51R as well as bearing supports 23, 25 constitute an inter-roller radial press section in the present invention.

Crankshaft 51L and output shaft 13 are made to project from housing 11 on the left side of FIG. 5. At the projecting portions, a seal ring 57 is disposed between housing 11 and crankshaft 51L, and a seal ring 58 is disposed between crankshaft 51L and output shaft 13. Seal rings 57, 58 liquid-tightly seal the projecting portions of crankshaft 51L and output shaft 13 that project from housing 11.

The center of the inside periphery and the center of the outside periphery of crankshaft 51L are set eccentric from one another at its end portion where seal rings 57, 58 are disposed, as at the portion where output shaft 13 is supported. Seal ring 57 is disposed between the outside periphery of the end portion of crankshaft 51L and housing 11, and seal ring 58 is disposed between the inside periphery of the end portion of crankshaft 51L and output shaft 13. This sealing construction makes it possible to preferably seal the place where output shaft 13 projects from housing 11, although the rotation axis $O_2$ of output shaft 13 revolves according to the revolution of output shaft 13.

The second embodiment is constructed similar to the first embodiment shown in FIG. 2, except the foregoing. Corresponding portions are only shown with the same symbols, without repetition of the explanation.

[Torque Distribution Control] The following describes torque distribution control of the third embodiment shown in FIGS. 5 and 6 and described above. On one hand, the torque from transmission 3 to input shaft 12 is transmitted directly from input shaft 12 through rear propeller shaft 4 (see FIG. 1) and rear final drive unit 5 (see FIG. 1) to left and right rear wheels 6L, 6R (main driving wheels), as in the first embodiment shown in FIG. 2, and as in the second embodiment shown in FIG. 3.

On the other hand, when controlling the rotational positions of crankshafts 51L, 51R through the pinion 55 and ring gears 51Lc, 51Rc by inter-roller pressing force control motor 45 so that the inter-roller-axis distance L1 becomes smaller than the sum of the semidiameter of first roller 31 and the semidiameter of second roller 32, and thereby rollers 31, 32 provide the roller-transmitted torque TR according to the radial pressing force therebetween, driving force distribution device 1 according to this embodiment directs to output shaft 13 a part of torque to left and right rear wheels 6L, 6R, through first roller 31 and second roller 32, and then transmits this torque to left and right front wheels (auxiliary driving wheels) 9L, 9R from the left end (in FIG. 5) of output shaft 13 through front propeller shaft 7 (see FIG. 1) and front final drive unit 8 (see FIG. 1). This allows four wheel driving of the vehicle wherein all of left and right rear wheels (main driving wheels) 6L, 6R and left and right front wheels (auxiliary driving wheels) 9L, 9R are driven.

Although output shaft 13 (rotation axis $O_2$ of output shaft 13) is made to revolve by the inter-roller mutual radial pressing force control (inter-roller roller-transmitted torque control) by inter-roller pressing force control motor 45, the revolution of output shaft 13 (rotation axis $O_2$ of output shaft 13) is absorbed by a universal joint that couples output shaft 13 to front propeller shaft 7, so that the torque transmission to left and right front wheels (auxiliary driving wheels) 9L, 9R is not inhibited.

Also in this embodiment, it is possible to adjust the inter-roller-axis distance L1 between first roller 31 and second roller 32 by controlling the rotational positions of crankshafts 51L, 51R about the axis $O_3$ through the pinion 55 and ring gears 51Lc, 51Rc by means of inter-roller pressing force control motor 45 so that the second roller rotation axis $O_2$ (the axis of output shaft 13) revolves around the crankshaft rotation axis $O_3$. The control of adjusting the inter-roller-axis distance L1 allows control of changing the radial pressing force (roller-transmitted torque TR) between first roller 31 and second roller 32.

According to the control of the radial pressing force between the first and second rollers 31, 32 (roller-transmitted torque TR), as the inter-roller-axis distance L1 is reduced from a control maximum value to the control minimum value, namely, as the radial pressing force between the first and second rollers 31, 32 (roller-transmitted torque TR) is increased from zero to the control maximum value, the characteristics of change of the roller-transmitted torque TR (auxiliary driving wheel (left and right front wheel) torque Tf) with respect to driving force distribution device input torque Tin changes from the characteristics indicated by the solid line D for k=0% in FIG. 9, through the characteristics indicated by the solid line C for k=25% in FIG. 9, to the characteristics indicated by the solid line B for kmax=50% in FIG. 9.

The control minimum value of the inter-roller-axis distance L1, and the control maximum value of the inter-roller radial pressing force (roller-transmitted torque TR) are values with which the auxiliary driving wheel torque distribution ratio is equal to the maximum value kmax=50% (auxiliary driving wheel torque maximum distribution condition). If the control maximum value of the inter-roller radial pressing force (roller-transmitted torque TR) is large so as to prevent slippage between the rollers in the entire range of driving force distribution device input torque Tin in contrast to the present embodiment, an auxiliary driving wheel maximum distribution torque Tfkmax that larger than necessary under actual use environments is directed to the auxiliary driving wheels (auxiliary driving wheels), so that the driving system of the left and right front wheels (auxiliary driving wheels) must be designed in consideration of this fact, and the strength of the driving system must be enhanced higher than necessary. This causes problems of unnecessary costs, and weight increase.

Accordingly, also in the present embodiment, the control maximum value of the radial pressing force between first roller 31 and second roller 32 (the control minimum value of the inter-roller-axis distance L1) is determined so that the maximum value of the roller-transmitted torque at the auxiliary driving wheel torque maximum distribution condition kmax=50% (maximum distribution condition maximum roller-transmitted torque) Tfmax which is determined by the control maximum value of the inter-roller radial pressing force (the control minimum value of the inter-roller-axis distance L1) is smaller than the auxiliary driving wheel maximum distribution torque Tfkmax, as indicated by the solid line B in FIG. 9.

As a result, when the inter-roller radial pressing force is set to the control maximum value (the inter-roller-axis distance L1 is set to the control minimum value), the roller-transmitted torque TR becomes a product of the maximum value of the auxiliary driving wheel torque distribution ratio (auxiliary driving wheel torque distribution ratio under auxiliary driving wheel maximum distribution condition) kmax=50% and the driving force distribution device input torque Tin (kmax× Tin), in the range of torque below the auxiliary driving wheel maximum distribution torque Tfkmax, as indicated by the solid line B in FIG. 9. In the range of torque above the auxiliary driving wheel maximum distribution torque Tfkmax, the roller-transmitted torque TR is limited to the maximum distribution condition maximum roller-transmitted torque Tfmax, because a true auxiliary driving wheel torque distribution ratio k is smaller than 50% due to slippage between the rollers, although under the auxiliary driving wheel torque maximum distribution condition kmax=50%, as indicated by the solid line B in FIG. 9.

The auxiliary driving wheel maximum distribution torque Tfkmax is equal to a product of the maximum value of the auxiliary driving wheel torque distribution ratio (auxiliary driving wheel torque distribution ratio under auxiliary driving wheel maximum distribution condition) kmax=50% and the maximum value of the driving force distribution device input torque Tinmax, and corresponds to a value based on an assumption that the maximum torque (maximum value of driving force distribution device input torque Tin) Tinmax is inputted to the driving force distribution device while the auxiliary driving wheel torque maximum distribution condition kmax=50% is maintained.

Accordingly, a larger torque than required to be directed to the auxiliary driving wheels under actual use environments is prevented from being transmitted to the auxiliary driving wheels, so that it becomes unnecessary to design the driving system of the auxiliary driving wheels in consideration of such a large torque. In this way, it is possible to solve the problems of unnecessary costs and weight increase described above.

This embodiment can produce the following operations and effects in addition to the operations and effects described above. The embodiment is constructed so that: second roller 32 is rotatably supported in central holes 51La, 51Ra of crankshafts 51L, 51R; the eccentric peripheries 51Lb, 51Rb of crankshafts 51L, 51R that are eccentric with respect to central holes 51La, 51Ra are rotatably supported with respect to bearing supports 23, 25 that are fixed to housing 11; and the radial displacement of second roller 32 is caused by rotational displacement of crankshafts 51L, 51R for control of changing the inter-roller-axis distance L1 between first roller 31 and second roller 32 (inter-roller radial pressing force: roller-transmitted torque TR). This allows the crankshafts 51L, 51R to be constructed in hollow crankshafts with central holes 51La, 51Ra, thereby achieving weight reduction.

Moreover, in this construction, output shaft 13, which is to be coupled to the auxiliary driving wheels, is coupled coaxially to second roller 32, and output shaft 13 is rotatably supported in central holes 51La, 51Ra of crankshafts 51L, 51R. For the coupling between output shaft 13 and second roller 32, the eccentric coupling shown in FIG. 4 that is required in the second embodiment is unnecessary, so that the structure is simplified, and the transmitting efficiency is enhanced.

Moreover, crankshafts 51L, 51R are provided in pairs and disposed on both axial ends of second roller 32; crankshafts 51L, 51R are meshed with common crankshaft driving pinion 55, under condition that crankshafts 51L, 51R are in rotational positions such that the eccentric peripheries 51Lb, 51Rb are aligned with one another in the circumferential direction; and the pair of crankshafts 51L, 51R are rotated as a unit by crankshaft driving pinion 55. This construction leads to the roller-transmitted torque control at both axial ends of second roller 32, and thereby enhances the accuracy of the control. According to these operations and effects, it is possible to rotate crankshafts 51L, 51R by the common single motor 45 while holding the rotational phases of crankshafts 51L, 51R identical to one another, although crankshafts 51L, 51R are provided in pairs.

[Fourth Embodiment] FIG. 7 shows a fourth embodiment of the present invention, which is provided by making the following modifications to the construction according to the third embodiment shown in FIG. 5. Specifically, the construction that the shaft 56 of crankshaft driving pinion 55 is rotatably supported is implemented not by construction that the shaft 56 is directly supported by housing 11, but by construction that the shaft 56 is supported by bearing supports 23, 25 that are fixed to housing 11, similar to the eccentric peripheries 51Lb, 51Rb of crankshafts 51L, 51R.

In this construction, the crankshaft driving pinion shaft 56 and crankshaft eccentric peripheries 51Lb, 51Rb are supported by the same member (bearing supports 23, 25). Accordingly, even if the inter-roller radial pressing force (roller-transmitted torque TR) is large so that the amount of extension of bearing supports 23, 25 in the inter-roller direction is large, the relative displacement between crankshafts 51L, 51R and crankshaft driving pinion 55 is suppressed. This serves to prevent an adverse effect that the meshing condition of crankshaft driving pinion 55 with respect to ring gears 51Lc, 51Rc provided in crankshafts 51L, 51R becomes abnormal.

[Fifth Embodiment] FIG. 8 shows a fifth embodiment of the present invention, which is provided by making the following modifications to the construction according to the third embodiment shown in FIG. 5. Specifically, a coupling member 59 is provided between the pair of crankshafts 51L, 51R, partly covering the periphery of second roller 32, so that the pair of crankshafts 51L, 51R are coupled to one another by coupling member 59.

The construction that the crankshafts 51L, 51R are coupled to one another makes it possible to reliably eliminate a difference in rotational phase between crankshafts 51L, 51R due to errors in ring gears 51Lc, 51Rc provided in crankshafts 51L, 51R, and thereby prevent that the difference in the inter-roller-axis distance L1 between both axial ends of second roller 32 causes unbalance contact of second roller 32 with first roller 31 and thereby adversely affects the durability of rollers 31, 32.

The invention claimed is:

1. A driving force distribution device configured to set torque distribution between main and auxiliary driving wheels by splitting and outputting to the auxiliary driving wheel a part of torque to the main driving wheel, the driving force distribution device comprising:
  a first friction roller configured to rotate together with a rotating member constituting a torque-transmitting path to the main driving wheel;
  a second friction roller configured to rotate together with a rotating member constituting a torque-transmitting path to the auxiliary driving wheel; and
  an inter-roller radial press section configured to press the first and second friction rollers in radial directions of the first and second friction rollers into pressing contact with one another, to allow torque transmission between the first and second friction rollers,
  wherein the inter-roller radial press section is configured to set a radial pressing force between the first and second friction rollers such that, when a maximum torque is inputted to the driving force distribution device under a condition that torque distribution to the auxiliary driving wheel is maximized, the inter-roller radial press section limits torque input to the auxiliary driving wheel by allowing slippage between the first and second friction rollers.

2. The driving force distribution device as claimed in claim 1, wherein:
  the inter-roller radial press section includes a mechanism configured to change an inter-roller-axis distance between the first and second friction rollers and limit the radial pressing force.

3. The driving force distribution device as claimed in claim 2, wherein the mechanism of the inter-roller radial press section is configured to set the radial pressing force to about zero by maximizing the inter-roller-axis distance.

4. The driving force distribution device as claimed in claim 2, wherein the mechanism of the inter-roller radial press section is configured to generate a clearance between the first and second friction rollers by maximizing the inter-roller-axis distance.

5. The driving force distribution device as claimed in claim 2, wherein the mechanism of the inter-roller radial press section is configured to change the inter-roller-axis distance by displacement of the second friction roller in the radial direction of the second friction roller.

6. The driving force distribution device as claimed in claim 5, wherein:
  the mechanism of the inter-roller radial press section is configured to change the inter-roller-axis distance by producing the displacement of the second friction roller by rotational displacement of a crankshaft, and
  the second friction roller is rotatably supported on an eccentric shaft portion of the crankshaft.

7. The driving force distribution device as claimed in claim 5, wherein:
  the mechanism of the inter-roller radial press section is configured to change the inter-roller-axis distance by producing the displacement of the second friction roller by rotational displacement of a crankshaft,
  the second friction roller is rotatably supported in a central hole of the crankshaft, and
  the crankshaft includes an eccentric periphery that is eccentric with respect to the central hole, and is rotatably supported by a fixed section.

8. The driving force distribution device as claimed in claim 7, wherein an output shaft to be connected to the auxiliary driving wheel is coaxially coupled to the second friction roller, and is rotatably supported in the central hole of the crankshaft, so that the second friction roller is rotatably supported in the central hole of the crankshaft.

9. The driving force distribution device as claimed in claim 7, wherein:
- the second friction roller is rotatably supported in a central hole of a second crankshaft,
- the second crankshaft includes an eccentric periphery that is eccentric with respect to the central hole of the second crankshaft and is rotatably supported by the fixed section,
- the two crankshafts are disposed on respective axial ends of the second friction roller and meshed with a common crankshaft driving pinion under a condition that the crankshafts are in rotational positions such that the eccentric peripheries are aligned with one another, so that the crankshafts are rotated as a unit by the crankshaft driving pinion under the condition that the eccentric peripheries of the crankshafts are aligned with one another.

10. The driving force distribution device as claimed in claim 9, wherein the crankshaft driving pinion is rotatably supported with respect to a bearing support by which the eccentric peripheries of the crankshafts are rotatably supported with respect to the fixed section.

11. The driving force distribution device as claimed in claim 9, comprising a coupling member disposed between the crankshafts, wherein the coupling member partly covers a periphery of the second friction roller, and couples the crankshafts to one another.

* * * * *